United States Patent [19]

Stella

[11] 4,285,581
[45] Aug. 25, 1981

[54] MULTIPURPOSE FILM HANDLING CASSETTE HAVING A MODULAR FILM PROCESSOR

[75] Inventor: Joseph A. Stella, Peabody, Mass.
[73] Assignee: Polaroid Corporation, Cambridge, Mass.
[21] Appl. No.: 108,521
[22] Filed: Dec. 31, 1979
[51] Int. Cl.³ .............................................. G03C 11/00
[52] U.S. Cl. .................................. 352/130; 352/78 R; 118/407
[58] Field of Search ........................ 352/130, 78 R, 72; 118/407, 412, 415

[56] References Cited

U.S. PATENT DOCUMENTS

| | | | |
|---|---|---|---|
| 3,615,127 | 10/1971 | Land .................................... | 352/130 |
| 3,623,417 | 11/1971 | Eloranta et al. . | |
| 3,667,361 | 6/1972 | Meggs et al. . | |
| 3,785,725 | 1/1974 | Batter et al. ........................ | 352/130 |
| 3,800,306 | 3/1974 | Land . | |
| 3,806,245 | 4/1974 | Land et al. .......................... | 352/130 |
| 3,809,465 | 5/1974 | Mason ................................. | 352/78 R |
| 3,895,862 | 7/1975 | Stella et al. ......................... | 352/130 |
| 3,999,844 | 12/1976 | Batter ................................. | 352/241 |
| 4,003,064 | 1/1977 | Mason ................................. | 352/130 |
| 4,105,307 | 8/1978 | Holmes et al. . | |
| 4,110,018 | 8/1978 | Finnemore .......................... | 352/130 |

Primary Examiner—Monroe H. Hayes
Attorney, Agent, or Firm—Frederick A. Goettel, Jr.

[57] ABSTRACT

An applicator is provided for depositing a coating of processing fluid on a moving run of photographic film strip which includes a single fluid reservoir having an opening in an exterior surface through which processing fluid may pass. A nozzle plate is provided also having a fluid opening therein and a reservoir facing surface which is configured to be urged toward the reservoir exterior surface and to sealingly engage and to cooperate with the reservoir surface so that fluid may flow through the nozzle plate opening when the plate and reservoir are in such confronting relation. A tear tab is initially interposed between the reservoir and the nozzle plate in sealing engagement around the opening in the reservoir exterior surface so that it initially seals processing fluid in the reservoir. Removal of the tear tab from the reservoir results in release of the fluid contained therein. The reservoir housing is provided with means for supporting the nozzle plate in an aligned spaced relationship with respect to the reservoir exterior surface with the tear tab lying therebetween. The reservoir nozzle plate and tear tab may be assembled in a modular fashion with the processing fluid initially sealed therein such that the modular fluid applicator may be readily installed in a processing station in a multipurpose film cassette.

7 Claims, 10 Drawing Figures

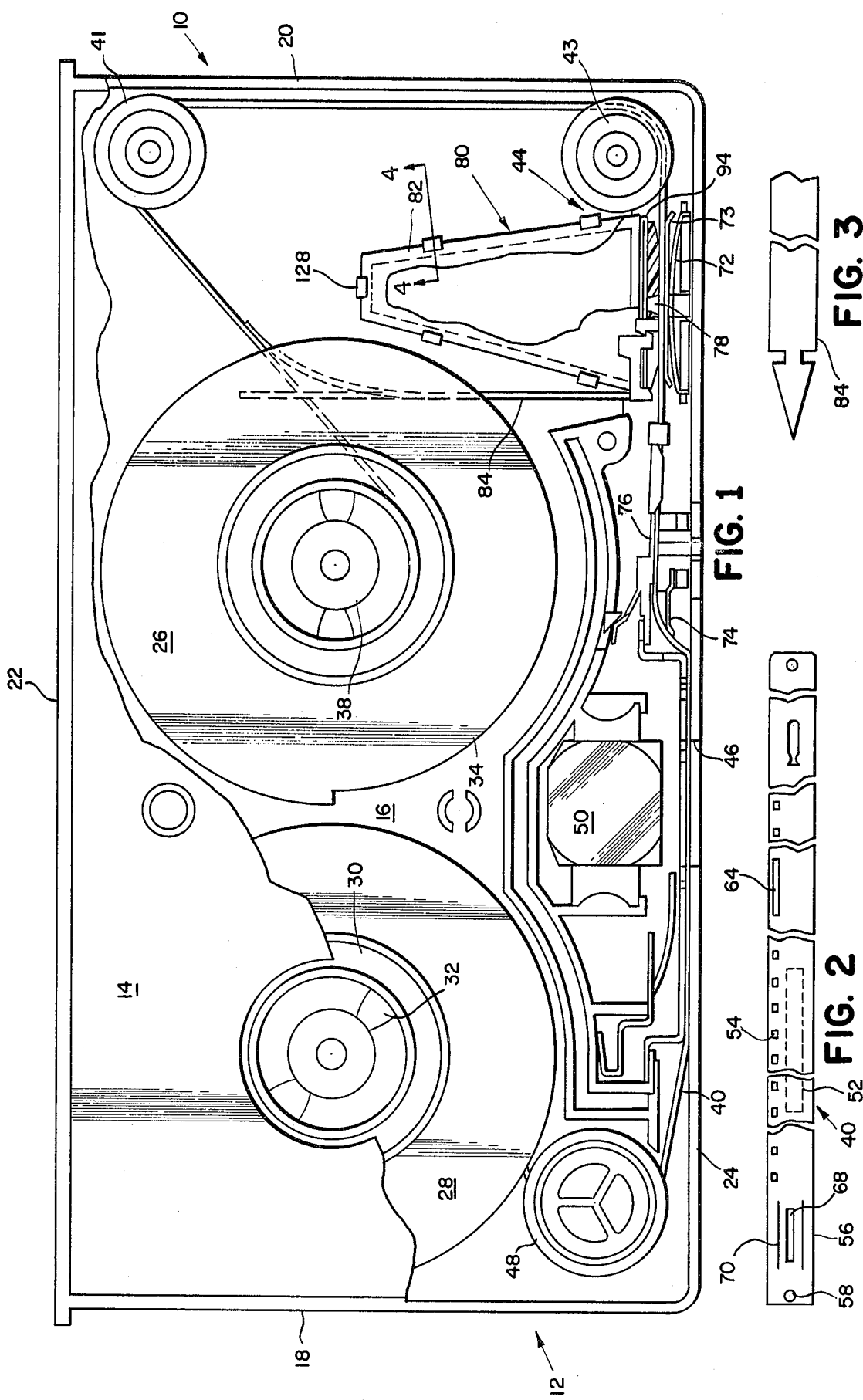

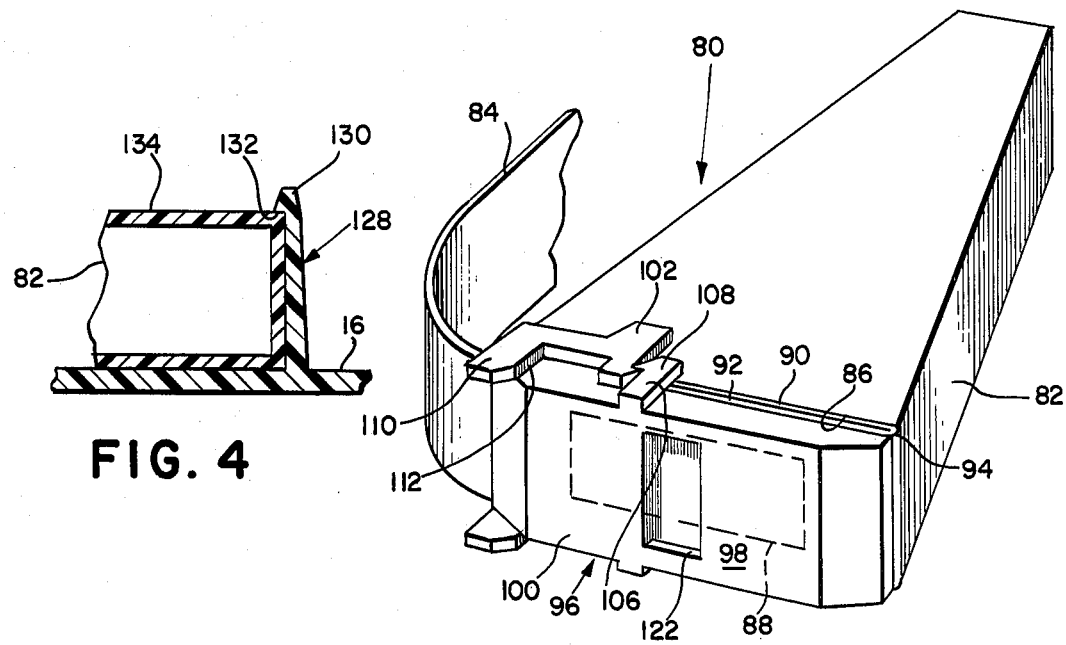
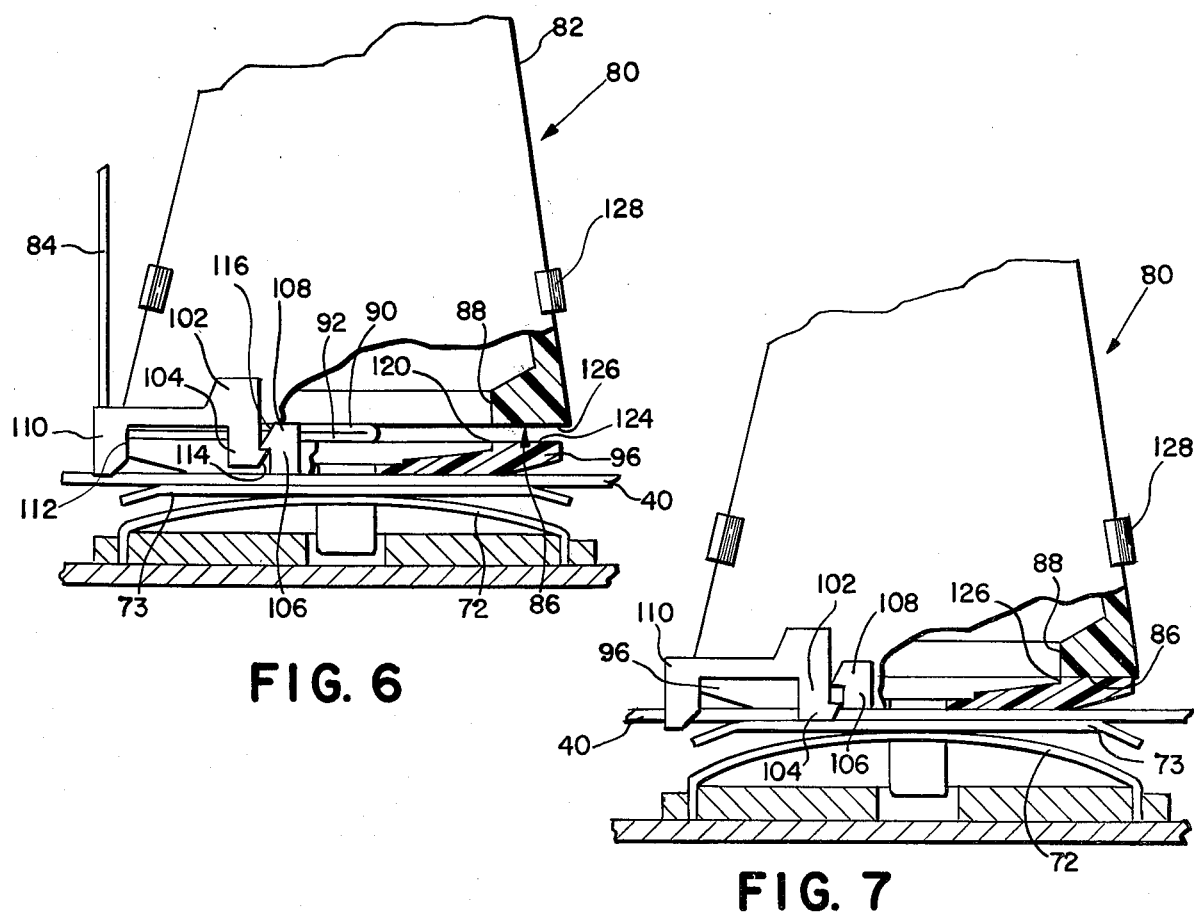

MULTIPURPOSE FILM HANDLING CASSETTE HAVING A MODULAR FILM PROCESSOR

BACKGROUND OF THE INVENTION

This invention relates to multipurpose photographic film handling cassettes in which an exposed film strip contained in the cassette may be processed, viewed by projection and rewound automatically without removal from the cassette in accordance with information supplied by the condition of the cassette and the film strip contained therein. More particularly, it concerns an improved arrangement for the initially sealed processing fluid containing reservoir arrangement which forms part of the film processing organization of such cassettes.

Multipurpose photographic film cassettes have been developed for use in cinematographic systems illustrated and described, for example, in U.S. Pat. No. 3,615,127 issued to Edwin H. Land on Oct. 26, 1971; U.S. Pat. No. 3,623,417 issued Nov. 30, 1971, to Vaito K. Eloranta; U.S. Pat. No. 3,785,725 issued Jan. 15, 1974 to John F. Batter, et al.; U.S. Pat. No. 3,895,862 issued July 22, 1975 to Joseph A. Stella, et al.; and U.S. Pat. No. 4,105,307 issued to William A. Holmes, et al. on Aug. 8, 1978, all of which are owned by the assignee of the present invention.

In such systems, a strip of photographic film contained in a cassette can be exposed in a camera adapted to receive the cassette and then processed to provide viewable images by placing the cassette in a viewing apparatus equipped to activate a cassette-contained processor upon rewinding the exposed film strip. After processing in this manner, the viewing apparatus is operated as a projector to advance the film incrementally frame by frame past a light source so that the scene to which the film was exposed is reproduced in a manner well known in the motion picture art.

In systems of the type aforementioned, the processing operation after film exposure and before viewing entails the deposition of a uniform coating of processing fluid along the length of the film strip to effect a diffusion transfer of a negative image in a light sensitive emulsion layer on the film strip to a positive image receiving layer or interface. The processing fluid supply is contained in an initially closed reservoir or pod housed within the film cassette. The reservoir is provided with a removable tear tab closure capable of being opened upon activation of the processor by the viewing apparatus to allow the fluid to escape from the pod and pass through a nozzle-like opening against the exposed emulsion layer on the film strip. Although the processor is operated only once in any single cassette, the housing of which provides a permanent container for the film strip therein, its operation to achieve a uniform and complete layer of processing fluid over the exposed emulsion layer on the film strip is vital to satisfactory operation of the overall system since any defect in the operation of the processor will result in undesirable and permanent blemishes plainly observable during projection of the processed film.

To ensure retention of the processing fluid in the cassette-contained reservoir or pod up to the time it is needed for the processing operation, and also in some measure to ensure complete availability of the processing fluid upon initial activation of the processor, the processing fluid reservoir in such systems is provided with a relatively large opening covered initially by a releasably bonded tear tab closure capable of being completely peeled from the opening to release the processing fluid for distribution against the emulsion layer of the exposed film strip. In prior systems of the type mentioned above, the tear tab initially sealing the processing fluid reservoir extends from one end of the reservoir opening to the other at which it is folded back upon itself.

As described in the above-noted U.S. Pat. No. 3,895,862, no viewer-mounted or other external means is needed for effecting a release of processing fluid from the initially sealed storage reservoir to initiate the processing cycle automatically upon rewinding the film strip after exposure in the cassette. The release of processing fluid from the reservoir is brought about by a pull strip extension connected at one end to the folded-back portion of the reservoir sealing tear tab and having at its free end, a configuration adapted to engage in an aperture formed in the trailing end portion of the film strip attached to the supply spool during initial rewind rotation of the supply spool. The pull strip, which may be mylar or other similar material having the physical characteristics of a photographic film strip, is initially supported and constrained to an essentially S-shaped tortuous path in which the intermediate leg is established by a channel formed by internal cassette walls. The pull strip accordingly extends initially upward in confronting relation with the tear tab, then makes a downward turn passing through the aforementioned channel and makes a second turn at the lower end thereof before exiting from the channel. At its exit from the channel, the extension is bent back on itself without exceeding the elastic limits of the material from which it is made so that the projecting free end lies yieldably against the outer convolutions of the film strip on the supply spool. As the film strip pays out from the supply spool during exposure, the free end of the pull strip will move inwardly due to the diminishing diameter of film strip convolutions on the supply spool until the film strip is completely exposed. At this time, an aperture in the supply spool connected trailing end portion of the film strip will have passed the free end of the pull strip extension so that upon rewinding of the film strip back onto the supply spool, a latching tongue at the free end of the pull strip will engage in the film strip aperture and become entrained between successive convolutions of the film strip supply spool trailing end portion. Continued rewind rotation of the supply spool will effect a pulling action on the pull strip causing it to advance through the S-shaped tortuous path and correspondingly, resulting in peeling of the tear tab closure from the processing fluid reservoir to release the processing fluid for application thereof to the exposed film strip. After having been peeled completely from the processing fluid reservoir, the tear tab is disengaged from the pull strip by a knife-like formation at the exit of the channel formed by the internal cassette walls. The removed tear tab closure will remain in a storage chamber defined by the channel once the processing cycle has been complete.

In order to define the above-noted S-shaped path at the processing station, a plurality of internal cassette transverse wall formations which form an integral part of the cassette have been necessitated. Further wall formations have been utilized in order to define a pair of chambers, one communicating to the processing fluid applicator nozzle and a second defining an initially sealed reservoir for the processing fluid which opens along one upright side of this chamber at a planar face to which the releasable tear tab closure is initially fixed. In practice, the fluid chamber actually provides an internal receptacle for a prefabricated and self-contained pod of processing liquid to which the tear tab closure is affixed. In this way, cassette assembly is facilitated by placing the pod in the chamber, threading the tear tab through the S-shaped path and then sealingly attaching a reservoir top to the upstanding wall formations defining the S-shaped path and the pair of fluid chambers.

It should be appreciated, accordingly, that in order to achieve reliable operation of such a processor, careful attention to assembly of the processor is necessary; the concommitant cost associated with such assembly is not insignificant.

In order to assure reliable separation of the tear tab from the processing fluid reservoir, a number of arrangements have been implemented in order to minimize drag as the pull strip passes through its path. One such example is illustrated in U.S. Pat. No. 4,110,018 to F. M. Finnemore and assigned to the assignee of the present invention wherein low friction guide arrangements are provided to guide the pull strip along its desired path. Such an arrangement, of course, requires added piece parts, additional assembly steps and accordingly, further added cost to the final assembled cassette.

SUMMARY OF THE INVENTION

The present invention relates to an applicator for depositing a coating of processing fluid on a moving run of photographic film strip which includes a single fluid reservoir having an opening in an exterior surface through which processing fluid may pass. A nozzle-plate is provided also having a fluid opening therein and a reservoir-facing surface which is configured to be urged toward the reservoir exterior surface and to sealingly engage and cooperate with the reservoir exterior surface so that fluid may flow through the nozzle plate opening when the plate and reservoir are in such confronting relation. A tear tab is interposed between the reservoir and the nozzle plate in sealing engagement around the opening in the reservoir exterior surface so that it initially seals processing fluid in the reservoir. Removal of the tear tab from the reservoir results in release of the fluid contained in the reservoir. The reservoir housing is provided with means for supporting the nozzle plate in an aligned spaced relationship with respect to the reservoir exterior surface with the tear tab lying therebetween. As a result, upon removal of the tear tab from between the nozzle plate and the reservoir, the nozzle plate may be moved into the above-described sealing engagement with the exterior surface of the reservoir. In a preferred embodiment, the tear tab has a second length folded back over the portion which seals the reservoir and terminates in a free end. The free end of the tear tab may be advanced in response to engagement with the film strip to peel off the tear tab for release of the processing fluid. Such an arrangement is similar to the arrangement described in conjunction with the prior art hereinabove.

In another embodiment, the fluid reservoir is provided with at least one recess, of a given depth, in its downwardly facing exterior surface. The nozzle plate is provided with at least one upwardly extending appendage on its planar surface which extends upwardly a distance less than or equal to the given depth of the recess in the reservoir exterior surface. The one or more appendages are configured to be cooperatively received within the recess of the fluid reservoir when the reservoir facing surface of the nozzle is operatively engaged with the exterior reservoir surface. Prior to removal of the tear tab, the appendages engage the tear tab and serve to space the reservoir facing surface of the nozzle from the reservoir defining a space therebetween where a sealing washer may be disposed.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 1 is a side elevation of the film cassette of this invention with the front wall thereof cut away and other portions thereof in partial section to illustrate the internal working components;

FIG. 2 is a fragmentary plan view of the film strip to be used in the cassette shown in FIG. 1;

FIG. 3 is an enlarged fragmentary plan view of the free end of the pull strip;

FIG. 4 is a sectional view taken along the line 4—4 of FIG. 1;

FIG. 5 is an enlarged perspective view showing the fluid applicator assembly of the present invention removed from a cassette;

FIG. 6 is an enlarged view of the cassette of FIG. 1 showing the tear tab partially removed from the reservoir exterior surface;

FIG. 7 is a view similar to FIG. 6 showing the tear tab completely removed and the fluid applicator in its operative condition.

DESCRIPTION OF THE PREFERRED EMBODIMENT

Figure 8:
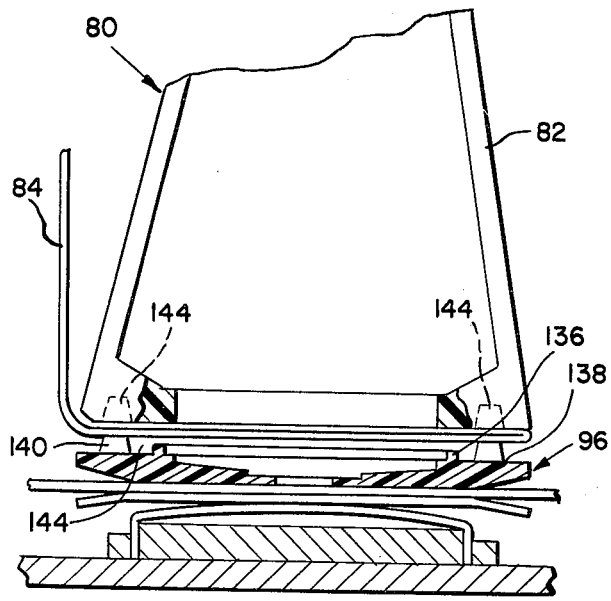
FIG. 8 is a view similar to FIGS. 6 and 7 illustrating another embodiment of the invention.

In the drawings, a multipurpose cassette incorporating the improvement provided by the present invention is generally designated by the reference numeral 10. As shown in FIG. 1, the cassette includes a generally parallelepiped casing or housing 12 established by planar faces or side walls 14 and 16, end walls 18 and 20 and elongated top and bottom edge walls 22 and 24, respectively. A pair of spools respectively designated hereinafter as supply spool 26 and takeup spool 28 are supported rotatably in the housing by annular, light-tight bearings 30 on the spools engaged by complementing ring-like embossments (not shown) on the interior of the side walls 14 and 16. Also, each spool is provided with a drive socket 32 for engagement by appropriate drive shafts in either of the camera (not shown) or the viewing apparatus (not shown) with which the cassette is used in accordance with the overall system described in the prior references cited above. Each of the spools 26 and 28 is provided further with a pair of opposed flanges 34 and 36 affixed to opposite ends of central hubs 38 to which opposite ends of a film strip 40 are permanently connected. Although the film strip will be described in more detail below, it will be noted from FIG. 1 that the path of the film strip 40 in the housing 12 extends from the hub 38 of the supply spool 26 about guide rollers 41 and 42 across a normally inoperative film processing station 44, an opening 46 in the bottom edge wall 24, about a further guide roll 48 and to the takeup spool 28. The opening 46 functions at different times to facilitate both exposure and projection of the film strip 40, a prism 50 being located behind the film strip at the opening 46 to facilitate the latter operation.

The film strip 40 functions as an operating component in the cassette over and above its principal function of recording photographic images and is shown in its full length in FIG. 2 of the drawings. As shown, the film is provided with a major central portion 52 of usable film upon which projectable images may be formed. To this end, the film strip includes a carrier base of any suitably strong transparent material carrying an emulsion or photosensitive coating of any conventional variety; for example, an emulsion developed by a monobath processing composition to form a positive transparency suitable for projection. Also, a series of uniformly spaced sprocket holes 54 are provided along the length of the film to facilitate incremental film advance during exposure and projection. At least the carrier base of the strip extends beyond the end of the central portion of the usable film 52 to provide at one end a leading end portion (takeup leader) 56 having an aperture 58 by which the takeup leader may be permanently affixed to the hub of the takeup spool 28. A trailing end portion (supply leader) 60 at the opposite end of the strip is similarly provided with an aperture 62 for permanent connection to the hub 38 of the supply spool 26. The strip is additionally provided with an elongated sprocket hole 64 of the approximate and proportionate length illustrated in FIG. 2, for the purpose of interrupting advance travel of the strip by the incremental drive mechanisms provided in the camera (not shown) and the projecting apparatus (not shown) with which the cassette is used. The film strip is further provided in its takeup end 56 with a configuration comprising a centrally disposed opening 68 flanked by a pair of elongated slots 70.

Turning again to FIG. 1, a balanced pressure pad 73 supported by a bowed spring 72 retains the film strip 40 in operative relation to a processing fluid applicator nozzle 78 during processing. Additionally, the opening 68 and the slots 70 (see FIG. 2) function at the end of the processing cycle to engage a finger 74 carrier at one end of a valve member 76 and serve to move the valve member responsive to movement of the film strip to seal the nozzle 78 at the processor station 44 at the end of the processing cycle. The operation of the balanced pressure pad 73 and spring 72 is more fully described in U.S. Pat. No. 3,951,530 issued to Frank M. Czumak, et al. on Apr. 20, 1976. Further, a bowed pressure pad spring arrangement which may be used with the present invention is shown and described in copending U.S. patent application Ser. No. 26,908, filed on Apr. 4, 1979, also assigned in common with the present invention.

The processing station sealing operation by the valve 76 is also more fully described in the aforementioned U.S. Pat. No. 3,785,725 and in U.S. Pat. No. 3,868,716 issued on Feb. 25, 1975, to Irving S. Lippert, et al., also owned by the assignee of the present invention. Since the above-noted patents fully describe these operations, no further detailed discussion will be presented here and only those aspects necessary for an understanding of the present invention will be discussed.

With reference now primarily to FIGS. 1 and 5, it will be seen that the fluid applicator according to the present invention comprises a modular fluid applicator assembly 80 which includes the fluid reservoir 82, the reservoir sealing tear tab 84 and the fluid applicator nozzle 78 in an integral unit which may be assembled separate from the cassette and readily snap-fitted into the cassette in operative engagement with the film strip and spring biased pressure pad 73. More specifically, the fluid reservoir 82 comprises a six-sided fluid housing which tapers from a narrow dimension at its upper end to a larger dimension at the other end thereof wherein a lower downwardly facing exterior surface thereof 86 is provided with a rectangular opening 88 through which processing fluid is initially introduced into the interior of the housing prior to sealing thereof with the tear tab and which further permits passage of the processing fluid from the reservoir upon removal of the tear tab.

Again with reference to FIGS. 1 and 5, the tear tab closure 84 comprises a first length thereof 90 which initially sealingly engages the downwardly facing surface 86 of the reservoir housing to seal the processing fluid within the housing and which extends from left to right as viewed in the above-noted drawing figures. The tear tab 84 further includes a second length thereof 92 which is folded back upon the first length at a fold 94 which extends therefrom to a location with respect to the film strip as shown in FIG. 1 in a manner such that it may cooperate with the film strip and be removed from the sealing engagement with the downwardly facing surface 86 in accordance with the teachings of U.S. Pat. No. 3,785,725.

The nozzle or nozzle plate 96 is supported in spaced relationship with respect to the downwardly facing reservoir surface 86 in a manner to be described hereinbelow. Such nozzle support arrangement being such as to permit the nozzle 96 to be initially spaced from the reservoir surface 86 permitting the tear tab arrangement described hereinabove to be interdisposed between the reservoir and the nozzle prior to removal of the tear tab and to permit movement of the nozzle plate 96 into sealing relationship with the reservoir surface 86 following removal of the tear tab. More specifically, the nozzle plate 96 comprises a substantially flat, rectangular component integrally molded from a synthetic resinous material and is provided with a fluid opening 122 therethrough which communicates with a doctoring conformation 98 which comprises a portion of the plate's downwardly facing surface 100 to thereby effect the desired application of processing fluid to a photographic film strip passing thereby when the fluid applicator is in operative engagement with other components of a cassette.

Looking now at the cooperation between the nozzle plate 96 and the reservoir in greater detail, it will be seen that the reservoir housing 82 is provided with at least a pair of downwardly extending appendages 102 structurally attached thereto on opposite sides thereof, each terminating in a pawl-type formation 104. Similarly, the nozzle plate 96 is provided with a pair of upwardly extending appendages 106, each terminating in a complimentary pawl arrangement 108 which when in engagement with the corresponding appendages 102 of the reservoir housing, will support the nozzle plate in the above-described spaced position with respect to the downwardly facing surface 86 of the reservoir housing 82 to permit the presence of the tear tab arrangement 84 therebetween in a manner such that it will not interfere with removal of the tear tab 84 upon actuation thereof. Further, it should be appreciated that the pawl supporting arrangement 104, 108 is such that, upon removal of the tear tab 84 from the reservoir 82, the pressure pad 73 and the pressure pad biasing spring 72 may readily displace the nozzle plate 96 upwardly into sealing engagement with the reservoir housing as will be described in more detail hereinbelow.

It should be appreciated that the above-described nozzle retaining arrangement requires that the nozzle plate 96 be in proper alignment with the downwardly facing surface 86 of the reservoir and to this end, a plurality of nozzle plate aligning appendages 110 are also structurally formed with the reservoir housing 82 and extend downwardly and engage suitable cooperating surfaces 112 on the nozzle plate 96 to maintain the plate in its desired aligned position. Such an arrangement is not shown and described in great detail herein as a similar arrangement has been used in prior art cassettes for properly aligning the nozzle with respect to an opening during assembly line operations on a cassette.

As is evident from the drawing figures, each of the pawl arrangements 104, 108 carried by the reservoir housing 82 and the nozzle plate 96, respectively, are provided with inclined surfaces 114, 116 respectively, and are fabricated such that they are sufficiently flexible such that the nozzle plate 96 may be snap-fitted into its position as shown in the drawings and, following such operation will be supported in its desired position by the aligning appendages 110 carried by the reservoir housing 82 and the engagement of the retaining pawls 104, 108 as described hereinabove.

As best seen in FIGS. 6 and 7, it will be noted that the opening 88 in the downwardly facing surface 86 of the reservoir housing 82 is substantially larger than the actual outlet opening 120 provided in the nozzle plate. Such large opening 88 assures immediate initiation of and constant flow of processing fluid from the reservoir upon actuation of the processor. It will be noted that the upwardly facing surface 118 of the nozzle plate 96 is provided with an initial opening 120 which is substantially the same size as the opening 88 in the fluid reservoir and which tapers downwardly to the desired smaller opening 122 which actually expresses the fluid for deposition upon the emulsion bearing surface E of the film strip. As a result, the nozzle plate 96 and the downwardly facing surface 86 of the fluid reservoir are each provided with peripherally extending sealing surfaces 124, 126 respectively, which are machined such that they will cooperate to form a sealing interface upon removal of the tear tab 84 and subsequent displacement of the nozzle plate 96 upwardly to the position shown in FIG. 7.

Accordingly, it should be appreciated that the modular fluid applicator arrangement of the present invention may be readily and easily assembled as a modular component as shown in FIG. 5. To accomplish this assembly, the processing fluid reservoir 82 is initially filled with a predetermined quantity of processing fluid, whereupon the tear tab closure is applied to the downwardly facing surface 86 of the reservoir housing and is folded back upon itself. The nozzle plate 96 is then snapped into place and retained in such position by the aligning appendages 110 and the mating pawls 104, 106 respectively, of the housing 82 and the nozzle plate 96.

Referring to FIGS. 1 and 4, it will be seen that installation of the modular fluid processor 80 may then simply be accomplished by placing the modular fluid reservoir/nozzle plate pull strip assembly in its predetermined position within the cassette which is defined by a plurality of upwardly extending processor aligning and retaining appendages 128 which may be integrally molded with the cassette base and of which five are shown in an exemplary manner in FIG. 1. One of such appendages 128 is shown in cross section in FIG. 4, where it will be seen that it terminates at its upper end in a modular processor-retaining conformation 130 which includes a downwardly facing processor-retaining surface 132 and an upwardly facing inclined surface 134. The inclined surface 134 of the appendages 128 are adapted to be engaged by the processor housing 82 upon positioning of the housing thereabove in the cassette housing. Downward pressure upon the housing results in temporary outward deflection of the appendages 128 permitting downward movement of the processor 80 towards the base 16 of the cassette housing. Once moved to its correct position, the appendages 128 flex back to their normal unflexed position and retain the modular processor 80 within the cassette with the downwardly facing surface 132 engaging the top surface 134 of the processor housing, permanently retaining it in such position for the useful life of the cassette.

Accordingly, upon complete assembly of a film cassette and use of the cassette in a motion picture camera to expose the film strip therein, the cassette may be inserted into a viewer/processor for actuation of the above-described modular processor. The viewer/processor will operably advance the film strip, resulting in engagement of the pull strip by the film strip and accordingly effecting rapid advancement of the tear tab 84 from the downwardly facing surface 86 of the reservoir housing as illustrated in FIG. 6 where the tear tab is shown partially removed from the reservoir housing 82. Continued advancement of the tear tab results in complete removal thereof, whereupon the pressure pad biasing spring 72 and the pressure pad 73 will urge the film strip 40 and the nozzle plate 96 into the position illustrated in FIG. 5. Continued advancement of the film strip will then result in passage of the processing fluid contained within the modular processor through the cooperating openings provided in the downwardly facing surface 86 of the reservoir housing and the nozzle plate 96 and result in passage of such fluid through the fluid applicator opening 122 and subsequent deposit of a predetermined thickness of such fluid upon the emulsion bearing surface of the film strip by the doctoring conformation 98 of the nozzle plate.

Figure 9:
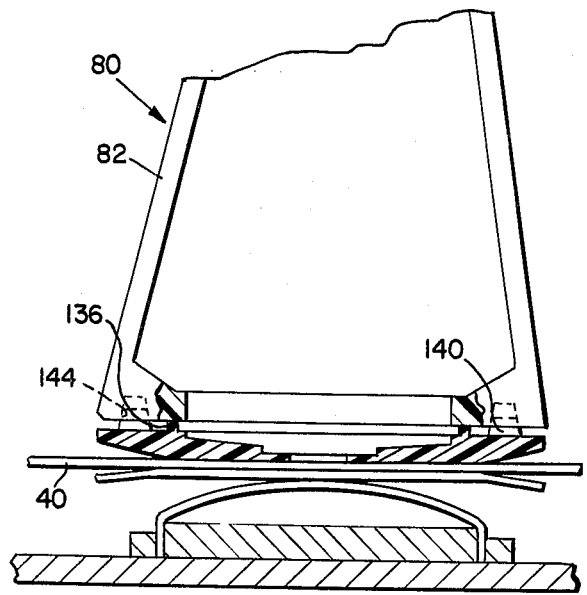
FIG. 9 is a view similar to FIG. 8 with the tear tab removed and the fluid applicator in its operating condition.
Figure 10:
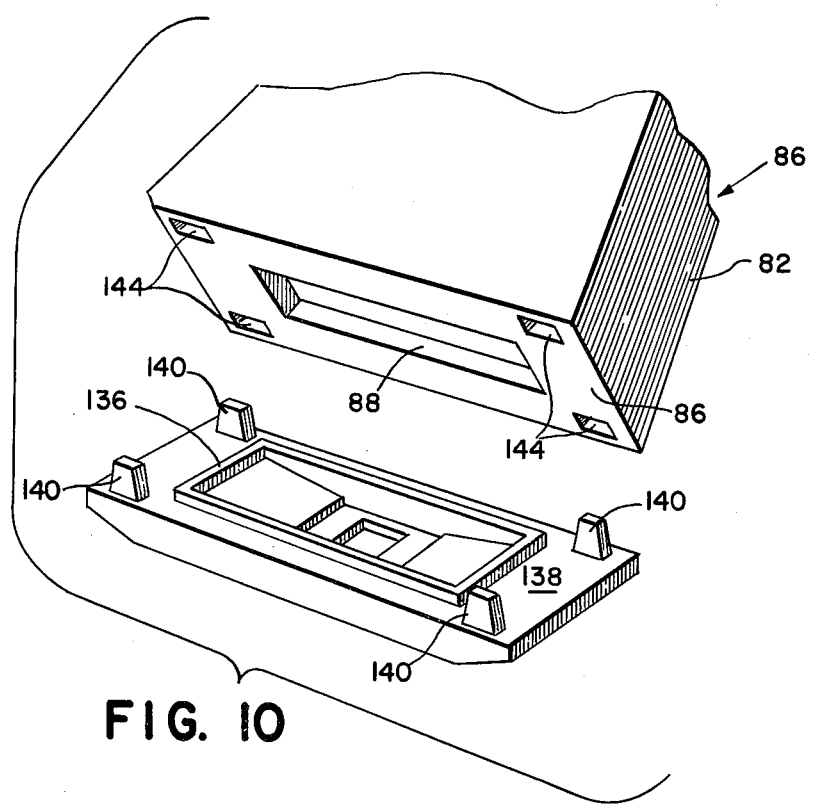
FIG. 10 is a fragmentary perspective view of the fluid applicator of FIGS. 8 and 9 showing the reservoir rotated rearwardly to illustrate the recesses provided in its downwardly facing exterior surface.

Referring now to FIGS. 8, 9 and 10, a somewhat simplified showing of a second embodiment of the present invention is shown to include a sealing washer 136 mounted upon the upwardly facing surface 118 of the nozzle plate 96 in surrounding relationship with the large upper portion 120 of the nozzle plate opening. This sealing washer 136 may be made of any number of rubberized or elastomeric materials and may be treated with a coagulant chemical to assure positive sealing between the upwardly facing nozzle plate surface 118 and the downwardly facing exterior surface 86 of the reservoir housing. Because the sealing washer 136 is made from a material which is deformable and tacky and, accordingly, has a high coefficient of friction, it is desirable that it not be in contact with the second length 92 of the tear tab 84 prior to removal of the tear tab from the processor housing. Accordingly, the upwardly facing surface 138 of the nozzle plate 96 is provided with four upwardly extending appendages 140 integrally formed therewith and located preferably at the four corners of the nozzle plate. These appendages 140 extend upwardly from the nozzle plate a distance at least as great as and, preferably, slightly higher than the thickness of the sealing washer 136. As is seen in FIG. 8, prior to removal of the tear tab closure 84, the upwardly extending appendages or spacer pins 140 will engage the lowermost surface 142 of the second length 92 of the tear tab 84 and serve to space the nozzle plate 96 from the tear tab, thus defining a space 144 therebetween where the washer 136 is located to assure that the washer does not come into contact with the tear tab. Accordingly, the washer 136 will not impair ready removal of the tear tab 84 nor will the washer be disturbed from its position upon removal of the tear tab. As best seen in FIG. 10, the downwardly facing exterior surface 86 of the fluid reservoir housing 82 is provided with four recesses 146 therein which are positioned with respect to the four upwardly extending spacer pins 140 of the nozzle plate 96 so as to cooperate and receive their respective spacer pin therein as shown in FIG. 9 when the tear tab 84 has been removed and the pressure pad spring 72 is permitted to urge the pressure pad 73, film strip 40 and the nozzle plate 96 into sealing engagement with the reservoir housing 82 as shown in FIG. 9. The sealing washer 136, under such conditions, is subjected to the biasing force of the pressure pad spring 72 and, accordingly, establishes a positive processing fluid-tight seal between the reservoir 82 and the nozzle plate 96, thus assuring that the processing fluid passes only from the reservoir 82 to the nozzle plate opening 120 and is expressed through the small nozzle plate opening 122 into the region of the doctoring conformation 98 to facilitate deposit of the processing fluid on the film strip emulsion. It should be appreciated that, while not shown in FIGS. 8, 9 and 10, the reservoir housing 82 and nozzle plate 96 of the present embodiment further may be provided with the cooperating pawl arrangement for holding the nozzle plate with respect to the reservoir housing when assembled as a modular processor. Further, the cooperating appendages provided on the reservoir housing, which serve to align the nozzle plate with respect to the housing upon assembly of the modular processor may also be provided. Installation of such an assembly within a cassette also is identical to that described hereinabove with respect to the first-described embodiment of the invention.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. An applicator for depositing a coating of processing fluid on a moving run of photographic film strip, the applicator comprising:
    a fluid reservoir having an opening in an exterior surface through which processing fluid may pass;
    a nozzle plate having a fluid opening therein and a reservoir-facing surface normally spaced from said reservoir exterior surface thereby defining a space therebetween, said nozzle plate being configured to be urged toward said reservoir exterior surface, to sealingly engage and cooperate with said reservoir exterior surface so that fluid will flow only through said nozzle plate opening when said plate and reservoir are so engaged;
    a tear tab having a first length thereof positioned in said space defined between said reservoir and said nozzle plate in sealing engagement around said opening in said reservoir exterior surface to initially seal processing fluid in said reservoir, said first length passing from said space between said reservoir exterior surface and said reservoir facing surface to a position wherein it is operative, responsive to advancing removal thereof from said reservoir exterior surface for releasing said fluid from said reservoir; and
    means structurally attached to said reservoir for removably supporting said nozzle plate in said spaced relationship with said reservoir exterior surface and with at least said first length of said tear tab positioned in said space defined therebetween, whereby upon removal of said first length of said tear tab from said space between said nozzle plate and said reservoir, said nozzle plate may move into sealing engagement with said exterior surface of said reservoir.

2. The fluid applicator of claim 1 wherein said supporting means prohibits said nozzle plate from moving away from said reservoir exterior surface beyond a predetermined distance, said distance being at least as great as the thickness of said tear tab.

3. The fluid applicator of claim 2 wherein said supporting means comprises a pair of downwardly extending appendages carried by said reservoir on opposite sides of said fluid opening, each of said appendages terminating in a formation presenting an upwardly facing support surface, and said nozzle plate has formed thereon nozzle retaining surfaces facing downwardly in confronting relation to each of said support surfaces.

4. The fluid applicator of either claim 1, 2 or 3 including means for biasing said nozzle plate into said sealing engagement upon removal of said first length of said tear tab.

5. An applicator for depositing a coating of processing fluid on a moving run of photographic film strip, the applicator comprising:
    a fluid reservoir having an opening in an exterior surface through which processing fluid may pass, said exterior surface further including at least one recess of a given depth positioned adjacent said opening;
    a nozzle plate having a fluid opening therein and a reservoir facing surface normally spaced from said reservoir exterior surface, thereby defining a space therebetween, said nozzle plate being configured to be urged towards said reservoir exterior surface to sealingly engage and cooperate with said reservoir exterior surface so that fluid will flow only through said nozzle plate opening when said plate and reservoir are so engaged, said reservoir facing surface having at least one appendage extending above said reservoir facing surface a distance less than or equal to said given depth of said recess and being configured to be cooperatively received within said recess when said reservoir facing surface is operatively engaged with said reservoir exterior surface;

a tear tab having a portion thereof positioned in said space defined between said reservoir and said nozzle plate with a first length of said tear tab in sealing engagement around the opening in said reservoir exterior surface to initially seal processing fluid in said reservoir, and operative, responsive to advancing removal of said tab portion from between said reservoir exterior surface and said nozzle, for releasing said fluid from said reservoir; and means for biasing said nozzle plate towards said reservoir exterior surface such that said appendage is in engagement with the portion of said tear tab positioned in said space, thereby spacing said reservoir facing surface from said tear tab and whereby, upon removal of said portion of said tear tab from said space between said nozzle plate and said reservoir, said appendage moves into said recess and said nozzle plate moves into proper sealing engagement with said reservoir exterior surface.

6. The fluid applicator of claim 5 including a sealing element having a thickness less than the height of said upwardly extending appendage and disposed upon said upwardly facing planar surface of said nozzle plate and further extending around the outer perimeter of said fluid opening in said nozzle plate.

7. An applicator for depositing a coating of processing fluid on a moving run of photographic film strip, the applicator comprising:

a fluid reservoir having a downwardly facing exterior surface having an opening therein through which processing fluid may pass, said exterior surface further including at least one recess, of a given depth, therein, positioned adjacent said opening;

a tear tab having a first length thereof in sealing engagement with said downwardly facing surface of said reservoir to initially seal processing fluid therein, said first length thereof overlying each of said recesses when in said sealing engagement, said tear tab further having a second length folded back over said first length and terminating in a free end, the advancement of said free end of said tear tab resulting in removal of said first length of said reservoir surface and release of the fluid contained therein;

a nozzle plate having a downwardly facing fluid applicator conformation including a fluid opening therein and an upwardly facing planar surface, said planar surface having at least one upwardly extending appendage carried thereby, said appendage extending upwardly a distance less than or equal to said given depth of said at least one recess and being configured to be cooperatively received within said recess with said upwardly facing planar surface in confronting relation with said downwardly facing exterior surface of said fluid reservoir, said first length and said second length of said tear tab closure being disposed between said downwardly facing exterior surface of said fluid reservoir and said upwardly facing surface of said nozzle plate;

means for biasing said nozzle plate toward said downwardly facing exterior surface of said reservoir such that when said opening in said exterior surface of said reservoir is in fluid communication alignment with said fluid opening of said nozzle plate and when each of said upwardly extending appendages of said nozzle plate is in cooperative alignment with a corresponding recess of said downwardly facing surface of said fluid reservoir, said nozzle plate will be urged into said confronting relationship with said exterior surface of said reservoir, said first and second lengths of said tear tab closure being of sufficient rigidity to resist said means for biasing said nozzle plate when in their initial position and, accordingly, said upwardly facing planar surface of said nozzle plate being spaced from said second length of said tear tab a distance equal to the height of said upwardly extending appendages; and a sealing element having a thickness less than the height of said upwardly extending appendages mounted upon said upwardly facing planar surface of said nozzle plate and extending around the outer perimeter of said fluid opening within said nozzle plate, whereby, upon advancement of said free end of said tear tab and the removal of said first length thereof from said reservoir surface, said means for biasing will displace said nozzle plate into the above-described cooperative relationship with said downwardly facing surface of said fluid reservoir, with each of said upwardly extending appendages thereof passing into cooperating relationship with its corresponding recess in said downwardly facing surface and said sealing element being urged into sealing relationship with said opening in said fluid reservoir's downwardly facing surface thereby resulting in a sealed fluid communication between said opening in said fluid reservoir surface and said nozzle plate's upwardly facing planar surface resulting in passage of said processing fluid from said reservoir through said nozzle opening into the region of said fluid applicator conformation and subsequent deposit thereof on a moving run of photographic film passing thereby.

* * * * *